(12) United States Patent
Lee et al.

(10) Patent No.: US 9,746,192 B2
(45) Date of Patent: Aug. 29, 2017

(54) AIR CONDITIONER

(71) Applicant: LG ELECTRONICS INC., Seoul (KR)

(72) Inventors: Yang Hwa Lee, Seoul (KR); Jin Hyouk Shin, Seoul (KR); Yee Kyeong Jung, Seoul (KR); Hoon Cheol Jeon, Seoul (KR); Sung Hwa Lee, Seoul (KR); Hyung Ho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 14/412,621

(22) PCT Filed: Jul. 4, 2013

(86) PCT No.: PCT/KR2013/005948
§ 371 (c)(1),
(2) Date: Jan. 2, 2015

(87) PCT Pub. No.: WO2014/007561
PCT Pub. Date: Jan. 9, 2014

(65) Prior Publication Data
US 2015/0143839 A1  May 28, 2015

(30) Foreign Application Priority Data

Jul. 5, 2012 (KR) .................. 10-2012-0073442

(51) Int. Cl.
*F24F 3/16* (2006.01)
*F25D 17/06* (2006.01)
(Continued)

(52) U.S. Cl.
CPC ............ *F24F 3/166* (2013.01); *F24F 1/0007* (2013.01); *F24F 3/1603* (2013.01); *F24F 7/007* (2013.01);
(Continued)

(58) Field of Classification Search
CPC combination set(s) only.
See application file for complete search history.

(56) References Cited

U.S. PATENT DOCUMENTS 4,133,652 A * 1/1979 Ishikawa ................. B03C 3/017
422/4
5,060,717 A * 10/1991 Morita .................. F24F 1/0007
165/119
(Continued)

FOREIGN PATENT DOCUMENTS

CN  1178140 A  4/1998
CN  1470807 A  1/2004
(Continued)

*Primary Examiner* — Amber R Orlando
*Assistant Examiner* — Sonji Turner
(74) *Attorney, Agent, or Firm* — Dentons US LLP

(57) ABSTRACT

An air conditioner capable of efficiently collecting foreign substances in the air is disclosed. The air conditioner includes a cabinet, an air blower disposed in the cabinet to cause air to flow, a dust collector case forming a channel for the air caused to flow by the air blower, at least one electrode provided in the dust collector case and formed of carbon fibers to generate ions, and a charged dust collecting filter to collect foreign substances charged by ions generated by the electrode.

14 Claims, 8 Drawing Sheets

(51) Int. Cl.
*F24F 7/007* (2006.01)
*F24F 1/00* (2011.01)
*F24F 13/28* (2006.01)

(52) U.S. Cl.
CPC .............. *F25D 17/06* (2013.01); *F24F 13/28* (2013.01); *F24F 2003/1635* (2013.01); *F24F 2003/1682* (2013.01)

(56) References Cited

U.S. PATENT DOCUMENTS

| | | | | |
|---|---|---|---|---|
| 5,092,396 | A * | 3/1992 | Murano | F24F 1/0007 165/119 |
| 5,958,112 | A * | 9/1999 | Nojima | B03C 3/32 55/359 |
| 6,171,376 | B1 * | 1/2001 | Hironaka | B03C 3/32 55/282.3 |
| 6,800,119 | B2 * | 10/2004 | Huang | A61L 9/16 422/123 |
| 7,040,101 | B2 * | 5/2006 | Takeda | A61L 9/22 62/264 |
| 7,120,006 | B2 * | 10/2006 | Sekoguchi | A61L 9/22 361/230 |
| 7,153,347 | B2 * | 12/2006 | Kang | F24F 3/1603 55/385.2 |
| 7,312,973 | B2 * | 12/2007 | Sekoguchi | A61L 9/22 361/231 |
| 7,332,019 | B2 * | 2/2008 | Bias | B03C 3/025 96/15 |
| 7,350,371 | B2 * | 4/2008 | Lee | F24F 1/0007 62/317 |
| 7,569,100 | B2 * | 8/2009 | Tanaka | A61L 9/22 95/2 |
| 7,638,104 | B2 * | 12/2009 | Taylor | B03C 3/12 422/121 |
| 7,651,548 | B2 * | 1/2010 | Tanaka | B01D 53/32 323/903 |
| 7,662,348 | B2 * | 2/2010 | Taylor | B01D 53/32 422/121 |
| 7,670,414 | B2 * | 3/2010 | Cha | B01D 46/12 55/418 |
| 7,679,879 | B2 * | 3/2010 | Furuhashi | A61L 9/22 361/231 |
| 7,722,707 | B2 * | 5/2010 | Tanaka | A61L 9/16 422/186.04 |
| 7,827,810 | B2 * | 11/2010 | Hur | F24F 1/0007 200/310 |
| 7,854,900 | B2 * | 12/2010 | Takeda | A61L 9/22 361/230 |
| 7,934,387 | B2 * | 5/2011 | Lee | B01D 46/0023 422/120 |
| 8,534,092 | B2 * | 9/2013 | Lee | F24F 1/0007 62/428 |
| 8,773,838 | B2 * | 7/2014 | Takeda | A61L 9/22 361/230 |
| 2003/0072675 | A1 * | 4/2003 | Takeda | A61L 9/22 422/22 |
| 2004/0007000 | A1 * | 1/2004 | Takeda | A61L 9/22 62/78 |
| 2004/0129140 | A1 * | 7/2004 | Park | B01D 46/10 96/59 |
| 2004/0130271 | A1 * | 7/2004 | Sekoguchi | A61L 9/22 315/111.81 |
| 2004/0144249 | A1 * | 7/2004 | Kang | F24F 3/1603 95/1 |
| 2004/0163542 | A1 * | 8/2004 | Huang | A61L 9/16 96/222 |
| 2005/0168907 | A1 * | 8/2005 | Sekoguchi | A61L 9/22 361/230 |
| 2005/0194583 | A1 * | 9/2005 | Taylor | B03C 3/12 257/10 |
| 2005/0284168 | A1 * | 12/2005 | Lee | F24F 1/0007 62/317 |
| 2006/0150818 | A1 * | 7/2006 | Okamoto | A61L 9/16 96/223 |
| 2007/0039472 | A1 * | 2/2007 | Bias | B03C 3/025 96/66 |
| 2007/0193448 | A1 * | 8/2007 | Tanaka | A61L 9/22 96/18 |
| 2007/0295213 | A1 * | 12/2007 | Okamoto | A61L 9/16 96/57 |
| 2008/0050288 | A1 * | 2/2008 | Okamoto | A61L 9/16 422/122 |
| 2008/0063559 | A1 * | 3/2008 | Alexander | A61L 9/22 422/22 |
| 2008/0074824 | A1 * | 3/2008 | Furuhashi | A61L 9/22 361/231 |
| 2008/0120989 | A1 * | 5/2008 | Tanaka | A61L 9/16 62/407 |
| 2008/0163754 | A1 * | 7/2008 | Tanaka | B01D 46/0023 96/55 |
| 2008/0314251 | A1 * | 12/2008 | Tanaka | B01D 53/32 96/95 |
| 2009/0010801 | A1 * | 1/2009 | Murphy | B01D 46/0028 422/4 |
| 2009/0169438 | A1 * | 7/2009 | Bruggink | A61L 9/014 422/121 |
| 2009/0282853 | A1 * | 11/2009 | Lee | B01D 46/0023 62/317 |
| 2010/0071397 | A1 * | 3/2010 | Takeda | A61L 9/22 62/264 |
| 2012/0282117 | A1 * | 11/2012 | Takahashi | F24F 7/007 417/65 |
| 2012/0314333 | A1 * | 12/2012 | Takeda | A61L 9/22 361/230 |

FOREIGN PATENT DOCUMENTS

| | | | |
|---|---|---|---|
| CN | 1510353 A | 7/2004 | |
| CN | 1611852 A | 5/2005 | |
| CN | 101109565 A | 1/2008 | |
| EP | 0616175 A2 | 9/1994 | |
| EP | 0 818 242 A1 | 1/1998 | |
| EP | 0 919 287 A2 | 6/1999 | |
| EP | 1 433 515 A2 | 6/2004 | |
| JP | EP 0919287 A2 * | 6/1999 | .............. B03C 3/32 |
| JP | 2005-55114 A | 3/2005 | |
| JP | 2008-57864 A | 3/2008 | |

* cited by examiner

AIR CONDITIONER

This application is a National Stage entry of International Application No. PCT/KR2013/005948, filed on Jul. 4, 2013, which claims priority to Korean Patent Application No. 10-2012-0073442 filed Jul. 5, 2012, all of which are incorporated by reference herein in their entirety.

TECHNICAL FIELD

The present invention relates to an air conditioner, and more particularly to an air conditioner capable of efficiently collecting foreign substances in the air.

BACKGROUND ART

An air conditioner is an apparatus that generally cools or heats an indoor space using a refrigeration cycle constituted by a compressor, an outdoor heat exchanger, an expansion valve, and an indoor heat exchanger. That is, the air conditioner may be configured with a cooler to cool the indoor space, and a heater to heat the indoor space. In addition, the air conditioner may be an air conditioner that is capable of both heating and cooling the indoor space.

The indoor unit of such an air conditioner is provided with a dust collector to collect and eliminate foreign substances such as dust floating in the air. The dust collector may come in various shapes. Recently, an electric dust collector that collects foreign substances by charging the foreign substances is used.

DISCLOSURE

Technical Solution

Therefore, the present invention has been made in view of the above problems, and it is an object of the present invention to provide an air conditioner capable of efficiently removing foreign substances from air without reducing air flow.

The present invention is not limited to the above objects. Other objects of the present invention will be clearly understood by those skilled in the art in view of the following disclosure.

In accordance with an aspect of the present invention, the above and other objects can be accomplished by the provision of an air conditioner including a cabinet, an air blower disposed in the cabinet to cause air to flow, a dust collector case forming a channel for the air caused to flow by the air blower, at least one electrode provided in the dust collector case and formed of carbon fibers to generate ions, and a charged dust collecting filter to collect foreign substances charged by ions generated by the electrode.

In accordance with another aspect of the present invention, there is provided an dust collector including a cabinet, an air blower disposed in the cabinet to cause air to flow, a dust collector case forming a channel for the air caused to flow by the air blower, an electrode provided in the dust collector case and allowing a current of a high voltage to be applied thereto, the electrode being formed of a carbon fiber, and a charged dust collecting filter disposed at a rear side of the electrode in the dust collector case.

DESCRIPTION OF DRAWINGS

The above and other objects, features and other advantages of the present invention will be more clearly understood from the following detailed description taken in conjunction with the accompanying drawings, in which.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a description will be given of an air conditioner of the present invention with reference to the drawings.

Figure 1:
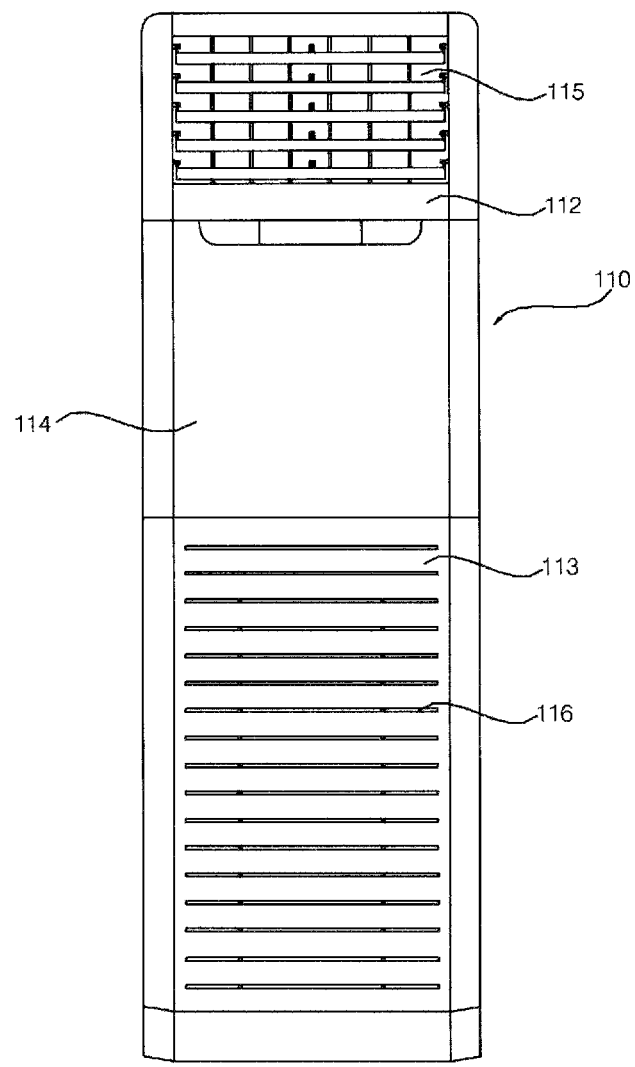
FIG. 1 is a front view showing an air conditioner according to an exemplary embodiment of the present invention.
Figure 2:
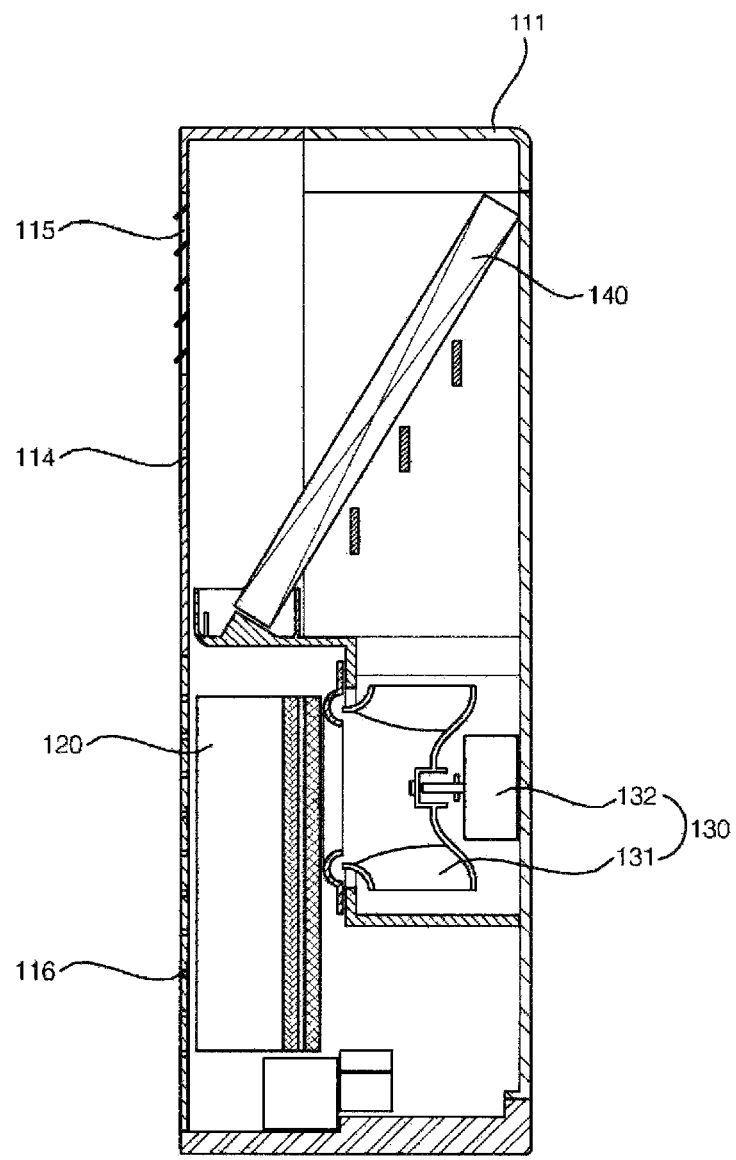
FIG. 2 is a cross-sectional view showing the air conditioner of FIG. 1.

FIG. 1 is a front view showing an air conditioner according to an exemplary embodiment of the present invention, and FIG. 2 is a cross-sectional view showing the air conditioner of FIG. 1.

The air conditioner 100 includes a cabinet 110, a dust collector 120 disposed inside the cabinet 110 to remove foreign substances from the moving air, an air blower 130 to force the air to flow, and a heat exchanger 140 to cause heat to be exchanged between the air blown by the air blower 130 and a refrigerant to adjust temperature. In the illustrated embodiment, the air conditioner 100 is a floor standing indoor unit.

The cabinet 110 includes a cabinet body 111, a cabinet cover 114 disposed at and coupled to the front of the cabinet body 111, a lower front panel 113 coupled to the cabinet body 111 and provided with an air suction portion 116 allowing external air to be suctioned into the cabinet 110 therethrough, and an upper front panel 112 coupled to the cabinet body 111 and provided with an air discharge portion 115 allowing the air in the cabinet 110 to be discharged to the outside.

The dust collector 120 ionizes molecules in the air, charges foreign substances with produced ions, and collects the charged foreign substances. The dust collector 120 will be described later in detail with reference to FIGS. 3 and 4.

The air blower 130 is disposed in the cabinet 110. The air blower 130 blows air such that air outside the cabinet 110 is suctioned into the cabinet 110, passes through the dust collector 120 and the heat exchanger 140, and is then discharged outside the cabinet 110. The air blower 130 includes a motor 132 to generate rotational power, and a fan 131 rotated by the motor 132.

The heat exchanger 140 causes heat exchange to occur between the air and a refrigerant to cool or heat the air. When the refrigerant evaporates in the heat exchanger 140, the air is cooled. When the refrigerant condenses, the air is heated. The heat exchanger 140 may include a pipe (not shown) through which the refrigerant flows, and a cooling fin (not shown) coupled to the pipe. The heat exchanger 140 is formed of a metallic material.

The air flows as follows. When the fan 131 is rotated by operation of the motor 132, the external air is introduced into the cabinet 110 through the air suction portion 116. While air introduced into the cabinet 110 passes through the dust collector 120, foreign substances are removed therefrom. The air from which the foreign substances are removed is transferred to the heat exchanger 140 according to rotation of the fan 131. The air is cooled or heated when it exchanges heat with the refrigerant in the heat exchanger 140. The air having exchanged heat with the refrigerant is discharged from the cabinet 110 through the air discharge portion 115.

Figure 3:
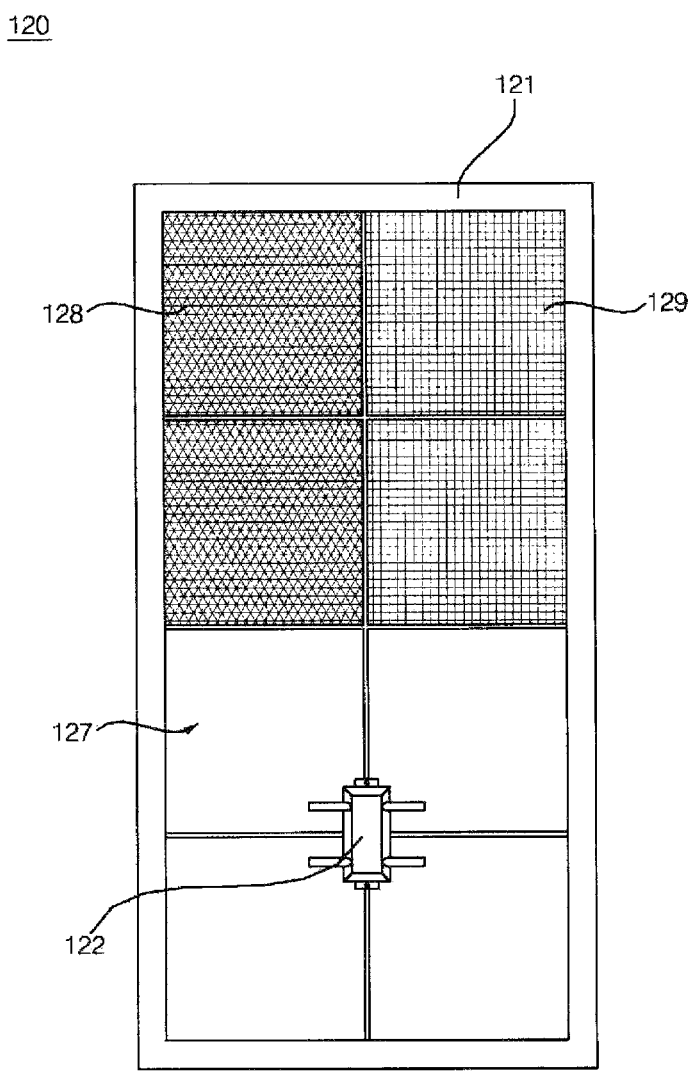
FIG. 3 is a front view showing a dust collector according to one embodiment of the present invention.
Figure 4:
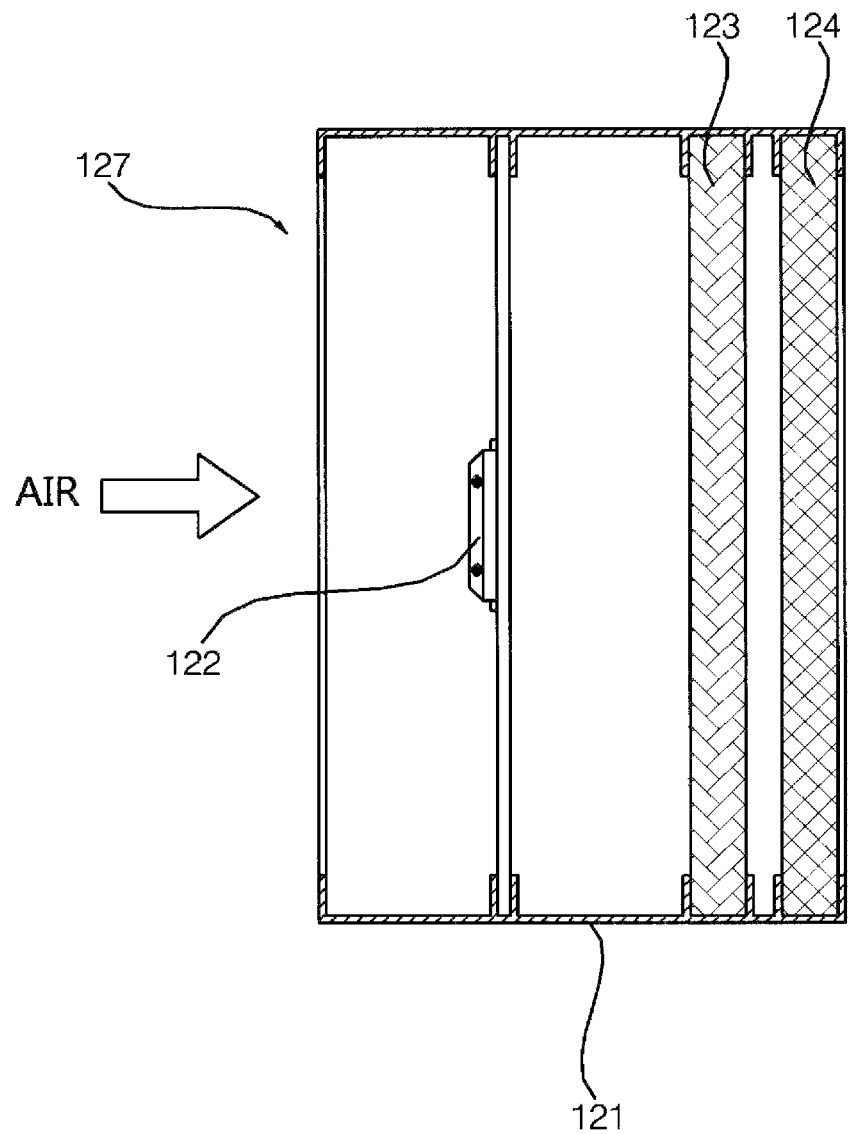
FIG. 4 is a partial cross-sectional view showing the dust collector shown in FIG. 3.

FIG. 3 is a front view showing a dust collector according to one embodiment of the present invention, and FIG. 4 is a partial cross-sectional view showing the dust collector shown in FIG. 3.

The dust collector 120 according to the illustrated embodiment includes a dust collector case 121 forming a flow channel allowing air to flow therethrough, an ionizer 122 to ionize molecules in the air to produce ions, a charged dust collecting filter 123 to collect foreign substances charged by ions produced by the ionizer 122, and a grounded ion trap 124 to collect the ions.

A flow channel is formed in the dust collector case 121 to allow the air suctioned through the air suction portion 116 to flow to the air blower 130. The dust collector case 121 is formed in a hollow shape to allow the air suction portion 116 to communicate with the air blower 130. In the illustrated embodiment, the dust collector case 121 is formed in a hexahedral shape having open opposite faces.

In the illustrated embodiment, the dust collector case 121 is partitioned into a plurality of sections, and the ionizer 122 is disposed in one of the sections. The ionizer 122 is preferably disposed at the center of a dust collecting section 127 at the lower portion of the dust collector case 121.

A sterilization filter 128 to eliminate germs and/or a deodorization filter 129 to eliminate odor may be disposed at a portion where the ionizer 122 is not disposed. In the illustrated embodiment, the sterilization filter 128 and the deodorization filter 129 are disposed at an upper portion of the dust collector case 121.

That is, the dust collector case 121 is partitioned into sections, by a cross sectional plane perpendicular to the air flow direction, such that different functions are performed in each section. One of the sections is a dust collecting section 127, in which the ionizer 122, the dust collecting filter 123, and the ion trap 124 may be disposed. In another section, the sterilization filter 128 may be disposed. In a further section, the deodorization filter 129 may be disposed.

In the illustrated embodiment, the ionizer 122, the sterilization filter 128, and the deodorization filter 129 are disposed in the same plane perpendicular to the air flow direction. However, in another embodiment, they may be sequentially disposed along the air flow direction. That is, the sterilization filter 128 and the deodorization filter 129 are sequentially disposed in the air flow direction, and then the ionizer 122 may be disposed.

In the dust collecting section 127 of the dust collector case 121, the ionizer 122, the dust collecting filter 123, and the ion trap 124 are sequentially arranged in the air flow direction.

The ionizer 122 generates high voltage, causing electrical discharge at an electrode and thus ionizing molecules in the air. The ions produced by the ionizer 122 charges foreign substances. The ionizer 122 is disposed in the middle of the dust collecting section 127. A detailed description of the ionizer 122 will be given later with reference to FIGS. 5 and 6.

The charged foreign substances are collected in the dust collecting filter 123. The dust collecting filter 123 is disposed at the back of the ionizer 122 along the air flow direction. The dust collecting filter 123 is formed of a resin material having small channels through allowing air to flow therethrough.

The dust collecting filter 123 is positively and/or negatively charged. A positively charged portion of the dust collecting filter 123 captures negatively charged foreign substances, while a negatively charged portion of the dust collecting filter 123 captures positively charged foreign substances.

As the dust collecting filter 123 is charged, the dust collecting filter 123 is preferably spaced a proper distance from the ionizer 122 such that the dust collecting filter 123 does not affect electrical discharge of the ionizer 122.

The ion trap 124 collects ions generated by the ionizer 122. The ion trap 124 is formed by a grounded metallic body to collect ions. The ion trap 124 is formed in the shape of a metallic mesh. The ions are reduced in the ion trap 124. The ion trap 124 collects and removes ions which are not used in charging foreign substances to prevent the ions from adversely affecting human health.

The ion trap 124 is disposed at the back of the dust collecting filter 123 along the air flow direction. Depending on embodiments, the ion trap 124 may be disposed at the front of or in the dust collecting filter 123.

The ion trap 124 may be disposed close to and spaced apart from the dust collecting filter 123. The distance between the ionizer 122 and the dust collecting filter 123 is greater than the distance between the dust collecting filter 123 and the ion trap 124.

Depending on embodiments, the ion trap 124 may be omitted and instead the heat exchanger 140 formed of a metallic material may be used. That is, the heat exchanger 140 may be grounded such that ions are collected by the heat exchanger 140.

Figure 5:
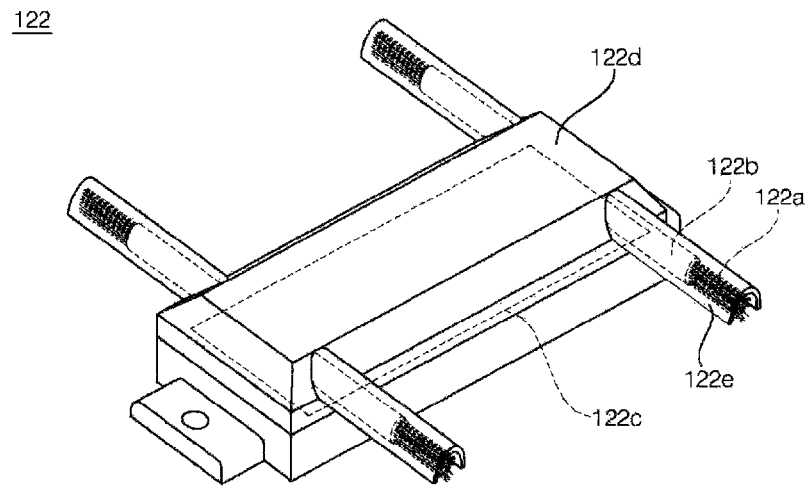
FIG. 5 is a perspective view showing an ionizer according to an embodiment of the present invention.
Figure 6:
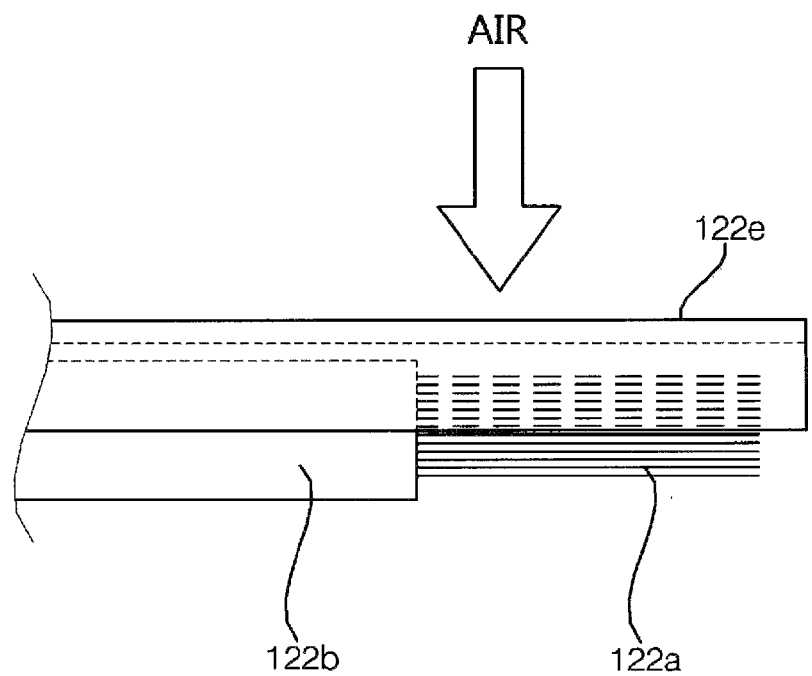
FIG. 6 is a detailed view showing a part of the ionizer shown in FIG. 5.

FIG. 5 is a perspective view showing an ionizer according to an embodiment of the present invention, and FIG. 6 is a detailed view showing a part of the ionizer shown in FIG. 5.

The ionizer 122 according to the illustrated embodiment includes a circuit 122c to generate high voltage, a circuit case 122d to surround the circuit 122c, an electrode 122a disposed outside of the circuit case 122d to discharge electricity according to high voltage generated by the circuit 122c to ionize molecules in the air, an electrode support tube 122b to connect the circuit case 122d to the electrode 122a, and an electrode cover 122e disposed at a portion around the electrode 122a.

The circuit 122c is a circuit to generate high voltage to allow the electrode 122a to discharge electricity. The circuit may generate alternating current, positive or negative direct current, or pulsed direct current at high voltage and supply the same to the electrode 122a. In the illustrated embodiment, the circuit 122c is a constant voltage circuit that generates negative direct current. The circuit 122c preferably has an output voltage of $-7$ kVp$\pm 8\%$, an output frequency of 110 Hz$\pm 10\%$, and a duty of 15% to 25%. The circuit 122c includes a circuit board and various electronic devices.

The circuit case 122*d* surrounds the circuit 122*c* to protect the circuit 122*c* and prevent electric leakage in the circuit 122*c*. The circuit case 122*d* is preferably formed of a plastic material and in the shape of a rectangular parallelepiped. Molding of silicone rubber may be performed inside of the circuit case 122*d* to protect the circuit 122*c*.

The electrode support tube 122*b* protrudes from the circuit case 122*d* to support the electrode 122*a*. The electrode support tube 122*b* is formed in the shape of a stick. One end of the electrode support tube 122*b* is connected to the circuit case 122*d*, and the other end is provided with the electrode 122*a*. The electrode support tube 122*b* includes a wire to transfer the high voltage generated by the circuit 122*c* to the electrode 122*a*, and a sheath formed of a plastic material to surround the outer side of the wire. The electrode support tube 122*b* electrically connects the circuit 122*c* to the electrode 122*a*.

A plurality of electrode support tubes 122*b* may be disposed depending on the number of the electrodes 122*a*. In the illustrated embodiment, four electrode support tubes 122*b* spaced from each other are disposed around the circuit case 122*d*.

The electrode 122*a* discharges electricity, thereby ionizing molecules in the air. When high voltage generated by the circuit 122*c* is applied to the electrode 122*a* via the electrode support tube 122*b*, the electrode 122*a* discharges electricity, ionizing molecules in the air. When high voltage is applied to the electrode 122*a*, negative ions such as OH— and O— or positive ions such as H+ are produced.

The electrode 122*a* may be formed of carbon fiber. If the electrode 122*a* is formed of superfine carbon fibers, ions are produced by corona discharge. The electrode 122*a* is preferably in the shape of a brush formed by binding hundreds of superfine carbon fibers having a diameter of a few micrometers to the electrode support tube 122*b*. In the illustrated embodiment, the electrode 122*a* is formed in the shape of a brush having about 1000 carbon fibers whose diameter is about 7 μm.

In the electrode 122*a* formed into a brush by binding carbon fibers, only one among hundreds of carbon fibers discharges electricity. Depending on embodiments, the electrode 122*a* may be formed in the shape of a needle, or of a mesh having a pattern. A plurality of electrodes 122*a* may be disposed. In the illustrated embodiment, four electrodes 122*a* are disposed.

Preferably, the electrodes 122*a* are properly spaced from each other to minimize mutual interference between the electrodes 122*a*. Preferably, the electrodes 122*a* are equally spaced from each other in an imaginary plane perpendicular to the air flow direction, and are symmetrically disposed with respect to a horizontal line and/or a vertical line.

Ions generated at the electrodes 122*a* charge foreign substances. Negative ions provide electrons to foreign substances, thus negatively charging the foreign substances, while positive ions remove electrons from foreign substances, thus positively charging the foreign substances.

The electrode cover 122*e* covers one side of the electrodes 122*a* facing the air flowing thereto. The electrode cover 122*e* is disposed at a position around the electrode 122*a* toward which air flows. The electrode cover 122*e* is disposed around the electrode 122*a* to face the air suction portion 116.

The electrode cover 122*e* is formed of a plastic material and in the shape of a semicircular tube. One side of the electrode cover 122*e* is connected to the circuit case 122*d*. The electrode cover 122*e* having a semicircular shape surrounds half of the circumferences of the electrode support tube 122*b* and the electrodes 122*a*. Depending on embodiments, the electrode cover 122*e* may be formed in various shapes. The electrode cover 122*e* may be formed in a cylindrical shape to surround the entire circumference of the electrode support tube 122*b* and leave a part of the circumference of the electrodes 122*a* uncovered.

The electrode cover 122*e* prevents any conductive material put through the air suction portion 116 by a user from contacting the electrodes 122*a*, and also prevents foreign substances contained in the flowing air from hitting the electrodes 122*a*. The portion of the electrode 122*a* facing in the direction in which air flows is open to the outside to generate ions.

Figure 7:
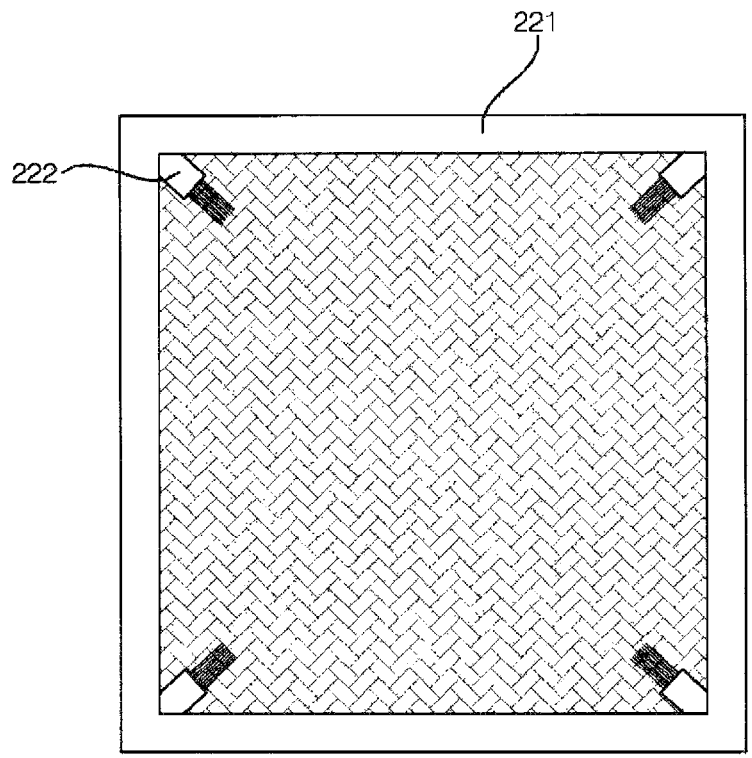
FIG. 7 is a front view showing a dust collector according to another embodiment of the present invention.

FIG. 7 is a front view showing a dust collector according to another embodiment of the present invention.

In the illustrated embodiment, four electrodes 222 are provided and disposed at four corners of a dust collector case 221 having a rectangular cross section. Four electrode support tubes (not shown) are also provided. In this case, an electrode cover (not shown) is preferably disposed around the electrodes 222.

Figure 8:
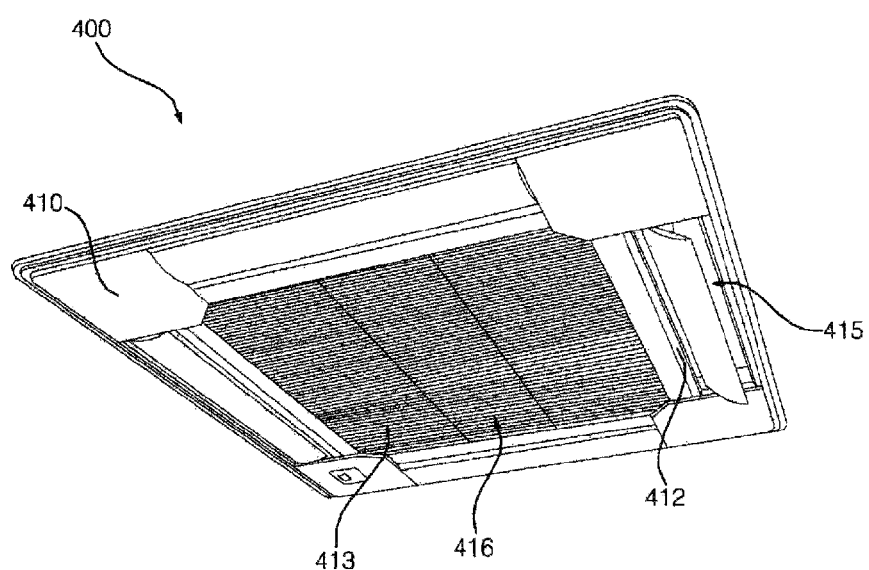
FIG. 8 is a perspective view showing an air conditioner according to another embodiment of the present invention.
Figure 9:
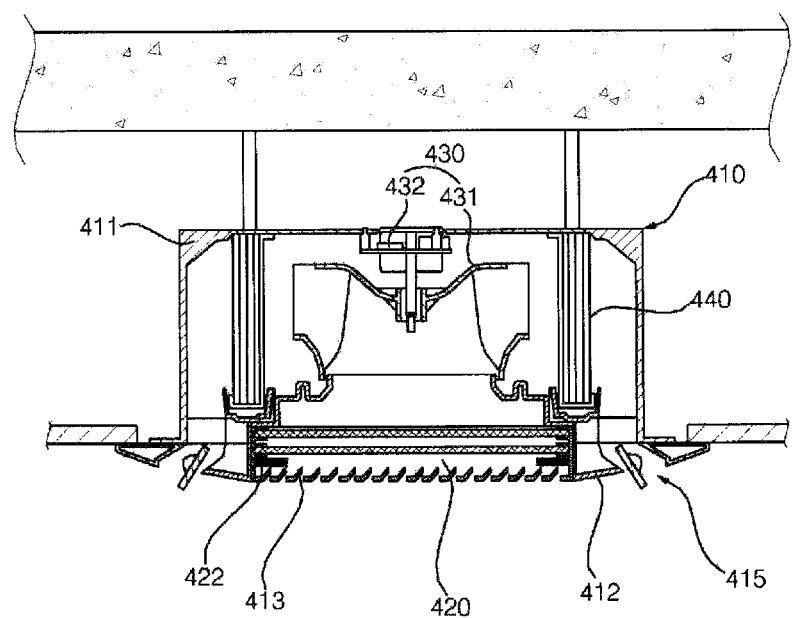
FIG. 9 is a cross-sectional view showing the air conditioner shown in FIG. 8.
Figure 10:
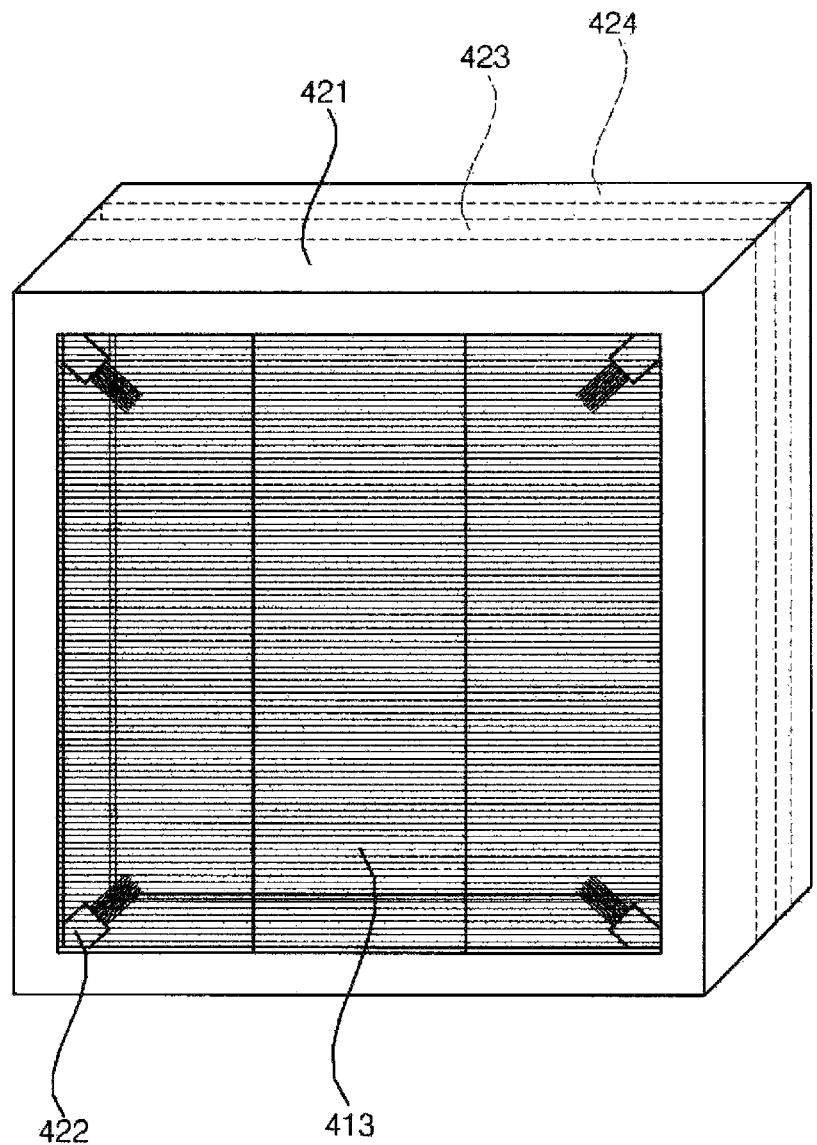
FIG. 10 is a perspective view showing a dust collector according to anther embodiment of the present invention.

FIG. 8 is a perspective view showing an air conditioner according to another embodiment of the present invention, FIG. 9 is a cross-sectional view showing the air conditioner shown in FIG. 8, and FIG. 10 is a perspective view showing a dust collector according to anther embodiment of the present invention.

The air conditioner 400 according to the illustrated embodiment includes a cabinet 410, a dust collector 420 disposed inside the cabinet 410 to eliminate foreign substances in the flowing air, an air blower 430 to cause the air to flow, and a heat exchanger 440 to cause heat to be exchanged between the air blown by the air blower 430 and a refrigerant to adjust temperature. In the illustrated embodiment, the air conditioner 400 is a ceiling-mounted indoor unit.

The cabinet 410 includes a cabinet body 411, a suction panel 413 coupled to the central part of the lower portion of the cabinet body 411 and provided with an air suction portion 416 allowing external air to be suctioned into the cabinet 410 therethrough, and a discharge panel 412 coupled to the periphery of the lower portion of the cabinet body 411 and provided with an air discharge portion 415 allowing the air in the cabinet 410 to be discharged to the outside therethrough.

The air blower 430 includes a motor 432 to generate rotational power, and a fan 431 rotated by the motor 432.

The heat exchanger 440 causes heat to be exchanged between air and a refrigerant to cool or heat the air and is disposed around the air blower 430.

The dust collector 420 includes a dust collector case 421 forming a flow channel allowing air to flow therethrough, an electrode 422 formed of carbon fiber to ionize molecules in the air, a charged dust collecting filter 423 to collect foreign substances charged by ions produced by the electrode 422, a grounded ion trap 424 to collect ions produced by the electrode 422. Preferably, an electrode cover (not shown) is disposed around the electrode 422. The electrode cover (not shown) is disposed at the side of the suction panel 413 around the electrode 422.

Preferably, the cross section of the dust collector case 421 is formed to correspond to the suction panel 413 such that the dust collector case 421 is coupled to the suction panel 413. By removing the dust collector case 421 coupled to the suction panel 413 from the cabinet body 411, the dust collecting filter 423 or the entire dust collector 420 coupled to the suction panel 413 may be replaced.

An air conditioner according to the present invention has one or more of the following effects.

First, an electrode to generate ions is disposed at an edge of a channel through which the air flows and therefore reduction in air flow due to the electrode may be minimized.

Second, the amount of ions generated may be maximized as an electrode is formed of carbon fibers arranged in a brush shape and causing corona discharge.

Third, as remaining ions unused in charging foreign substances are removed, problems associated with are minimized.

Fourth, a dust collector may be disposed together with a sterilization/deodorization filter.

Fifth, the dust collector can be easily replaced.

The present invention is not limited to the above effects. Other effects not mentioned above may be clearly understood by those skilled in the art based on the claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An air conditioner comprising:
   a cabinet;
   an air blower disposed in the cabinet to cause air to flow;
   a dust collector case forming a channel for the air caused to flow by the air blower;
   at least one electrode provided in the dust collector case and formed of carbon fibers to generate ions;
   a charged dust collecting filter to collect foreign substances charged by ions generated by the electrode; and
   a grounded ion trap to collect the ions generated by the electrode.

2. The air conditioner according to claim 1, wherein the electrode is formed of superfine carbon fibers bound in a brush shape.

3. The air conditioner according to claim 1, wherein the electrode is disposed at an inner wall of the dust collector case.

4. The air conditioner according to claim 3, wherein the dust collector case has a quadrangular cross section,
   wherein the at least one electrode includes four electrodes disposed at each of four corners of the dust collector case.

5. The air conditioner according to claim 1, wherein the at least one electrode includes a plurality of electrodes disposed spaced from each other in an imaginary plane perpendicular to an air flow direction.

6. The air conditioner according to claim 1, further comprising a heat exchanger to cause heat to be exchanged between the air caused to flow by the air blower and a refrigerant, the heat exchanger being grounded to collect the ions generated by the electrode.

7. The air conditioner according to claim 1, wherein the dust collector case is partitioned into a plurality of sections,
   wherein the electrode is disposed in one of the sections of the dust collector case.

8. The air conditioner according to claim 7, further comprising:
   a sterilization filter disposed in another one of the sections of the dust collector case; and
   a deodorization filter disposed in a further one of the sections of the dust collector case.

9. The air conditioner according to claim 1, further comprising a suction panel provided with an air suction portion, the air caused to flow by the air blower being suctioned into the air suction portion,
   wherein the dust collector case is coupled to the suction panel.

10. The air conditioner according to claim 9, wherein a cross section of the dust collector case is formed to correspond to the suction panel.

11. The air conditioner according to claim 9, wherein the dust collector case is removable together with the panel from the cabinet.

12. An air conditioner comprising:
   a cabinet;
   an air blower disposed in the cabinet to cause air to flow;
   a dust collector case forming a channel for the air caused to flow by the air blower;
   an electrode provided in the dust collector case and allowing a current of a high voltage to be applied thereto, the electrode being formed of a carbon fiber;
   a charged dust collecting filter disposed at a rear side of the electrode in the dust collector case; and
   an ion trap disposed at a rear side of the dust collecting filter and configured with a grounded metallic member.

13. The air conditioner according to claim 12, further comprising a heat exchanger disposed at a rear side of the dust collecting filter to cause heat to be exchanged between the air caused to flow by the air blower and a refrigerant.

14. An air conditioner comprising:
   a cabinet;
   an air blower disposed in the cabinet to cause air to flow;
   a dust collector case forming a channel for the air caused to flow by the air blower;
   an electrode provided in the dust collector case and allowing a current of a high voltage to be applied thereto, the electrode being formed of a carbon fiber;
   a charged dust collecting filter disposed at a rear side of the electrode in the dust collector case; and
   an ion trap disposed between the electrode and the dust collecting filter and configured with a grounded metallic member.

* * * * *